(12) United States Patent
Yokota et al.

(10) Patent No.: US 8,862,306 B2
(45) Date of Patent: Oct. 14, 2014

(54) METHOD FOR CONTROLLING MOVEMENT OF TRAVELLING CARRIERS

(71) Applicants: Toshiaki Yokota, Shiga (JP); Kazuhiko Miyoshi, Shiga (JP); Masatsugu Kamei, Shiga (JP); Atsunobu Iseki, Shiga (JP)

(72) Inventors: Toshiaki Yokota, Shiga (JP); Kazuhiko Miyoshi, Shiga (JP); Masatsugu Kamei, Shiga (JP); Atsunobu Iseki, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 13/923,051

(22) Filed: Jun. 20, 2013

(65) Prior Publication Data

US 2013/0282223 A1 Oct. 24, 2013

Related U.S. Application Data

(63) Continuation of application No. PCT/JP2012/051836, filed on Jan. 27, 2012.

(30) Foreign Application Priority Data

Feb. 2, 2011 (JP) ................................. 2011-020547

(51) Int. Cl.
*G01C 22/00* (2006.01)
*G05D 1/00* (2006.01)
*G05D 1/02* (2006.01)
*B62D 65/18* (2006.01)

(52) U.S. Cl.
CPC ............... *G05D 1/028* (2013.01); *B62D 65/18* (2013.01)
USPC ............... 701/24; 701/23; 180/167; 180/168

(58) Field of Classification Search
USPC ............ 701/1, 22–27, 36, 116–119; 180/167, 180/168, 170
See application file for complete search history.

(56) References Cited

U.S. PATENT DOCUMENTS

| 6,129,025 A * | 10/2000 | Minakami et al. ......... 104/88.01 |
| 2007/0293996 A1 * | 12/2007 | Mori et al. ...................... 701/23 |
| 2010/0204833 A1 * | 8/2010 | Lund ............................. 700/275 |
| 2013/0282168 A1 * | 10/2013 | Yokota et al. ................. 700/230 |

FOREIGN PATENT DOCUMENTS

| JP | H044409 A | 1/1992 |
| JP | H06211332 A | 8/1994 |
| JP | 2001216024 A | 8/2001 |

OTHER PUBLICATIONS

International Search Report Application No. PCT/JP2012/051836 Completed: Mar. 15, 2012; Mailing Date: Mar. 27, 2012 1 page.

* cited by examiner

*Primary Examiner* — Rami Khatib
(74) *Attorney, Agent, or Firm* — St. Onge Steward Johnston & Reens LLC

(57) ABSTRACT

A method for controlling movement of travelling carriers includes performing data communication between front and rear adjacent travelling carriers, an on-board communication device provided to the travelling carrier and performing data communication with a ground-based communication device, and the ground-based communication device sending a movement permission signal at one end of a work area to the on-board communication device of a passing travelling carrier; and transmitting the movement permission signal to all of the travelling carriers within the work area from the ground-based communication device via the on-board communication device and the data communication means.

6 Claims, 10 Drawing Sheets

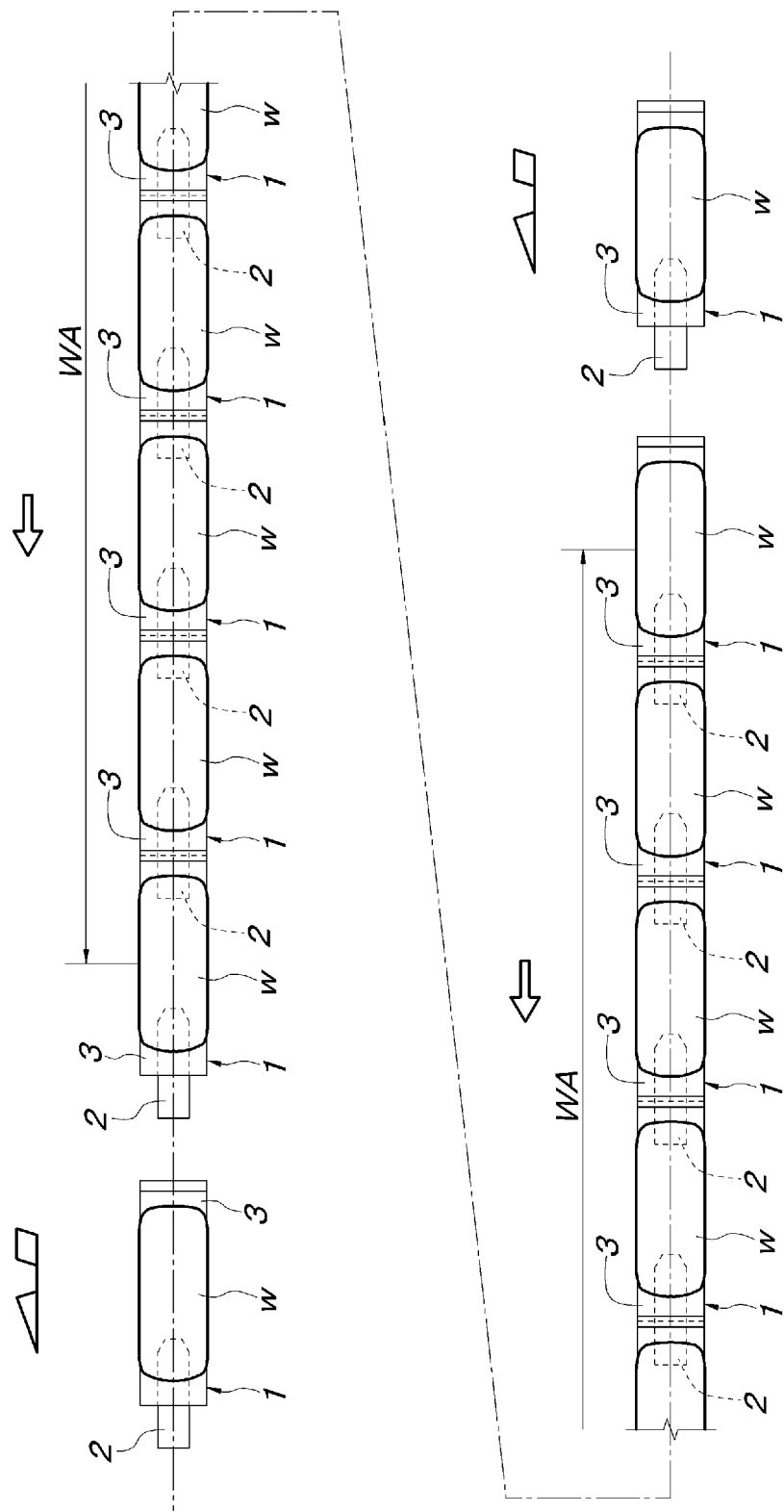

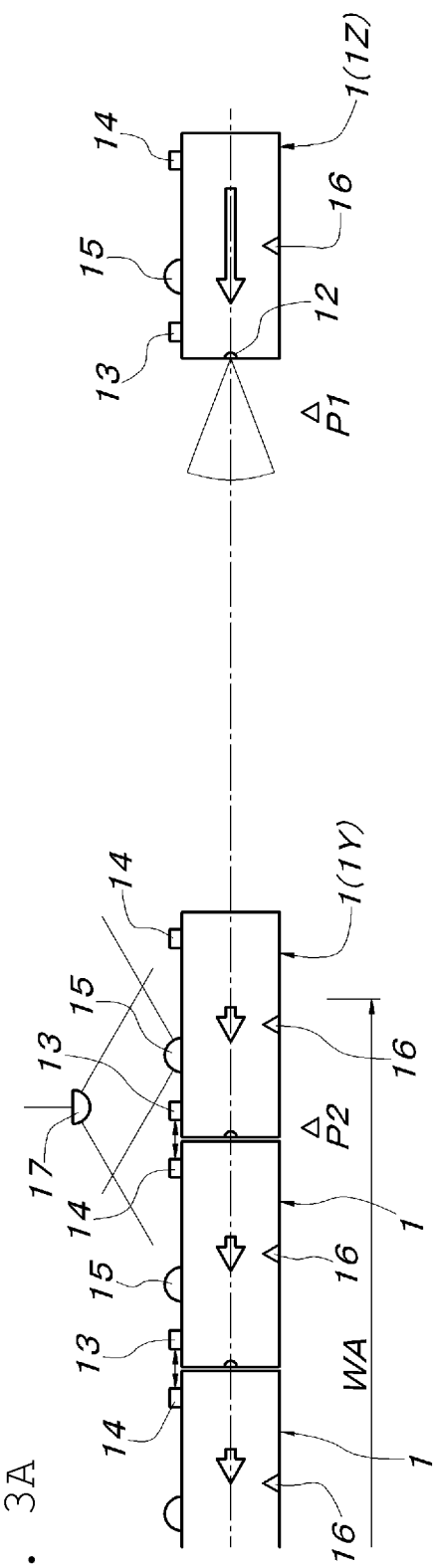

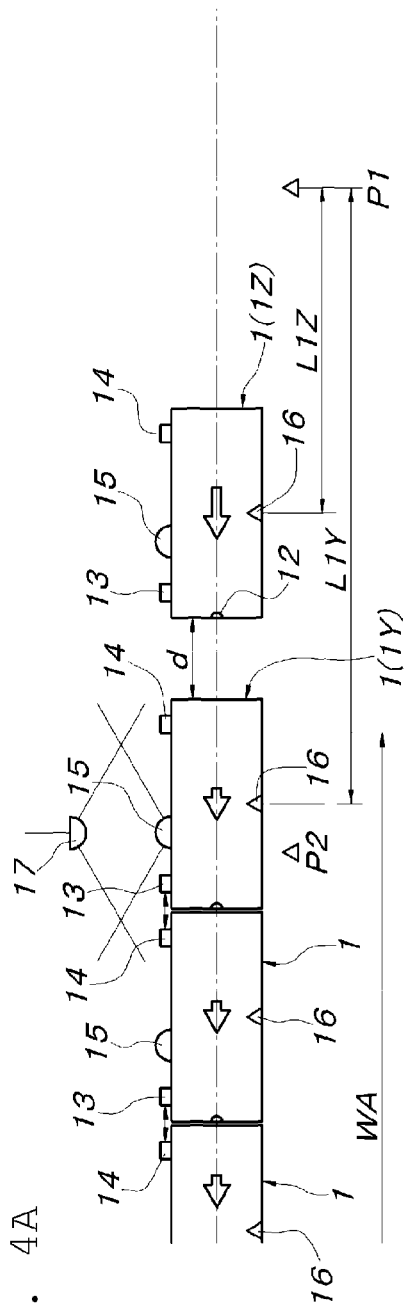
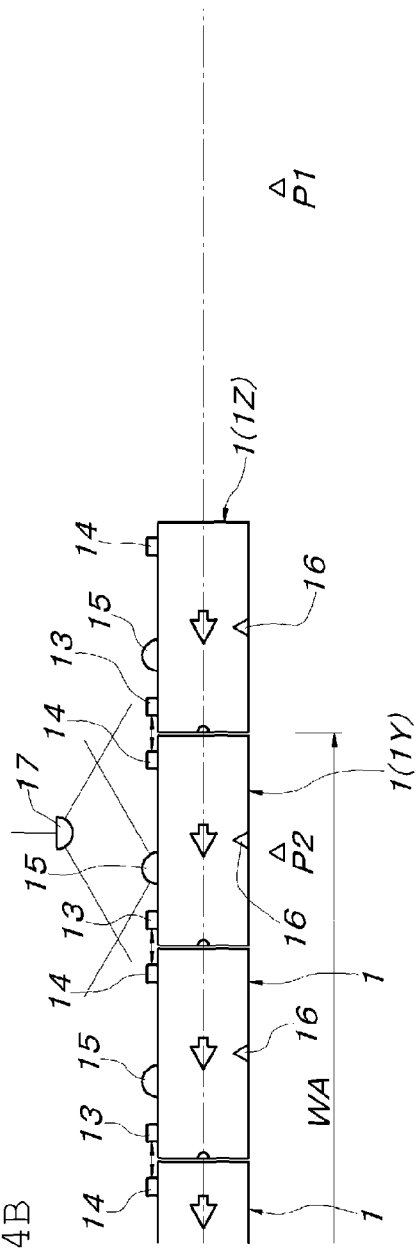

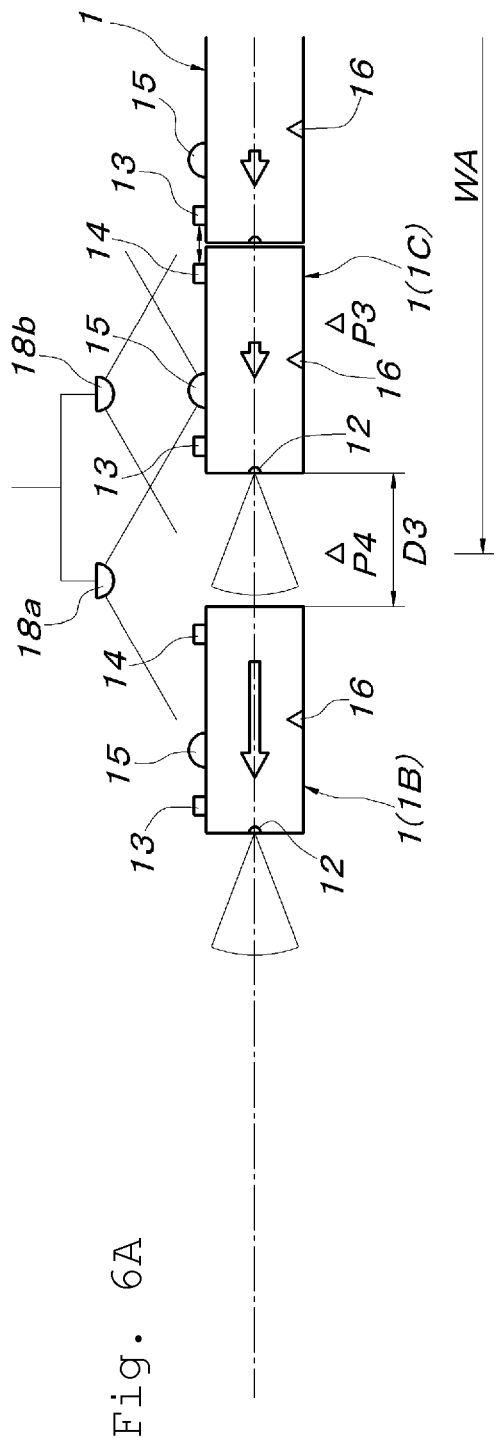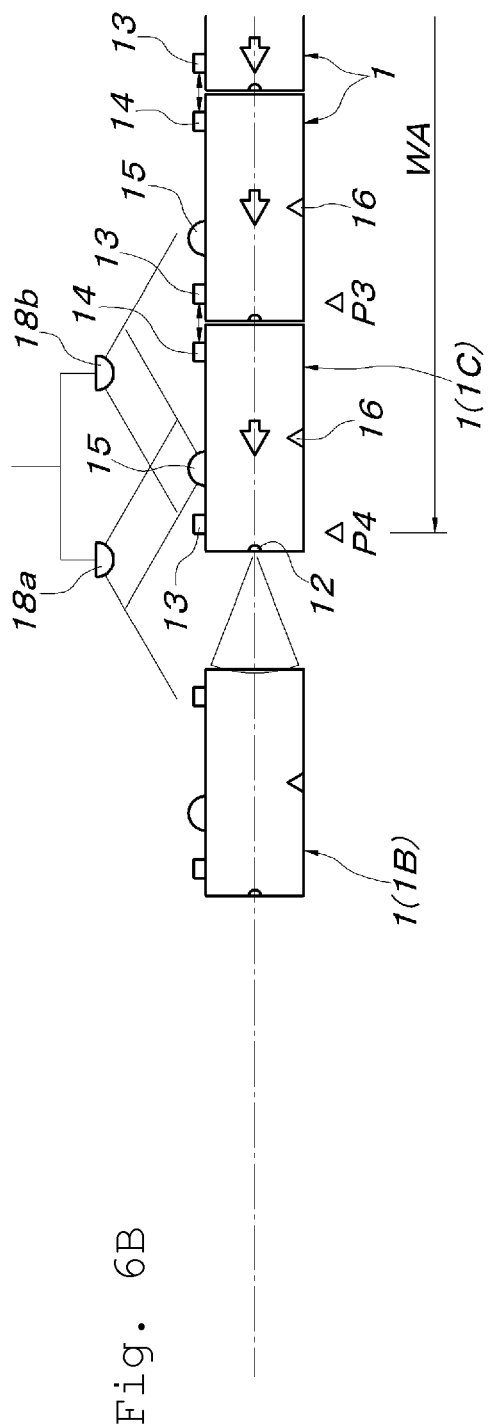
Fig. 6A
Fig. 6B

METHOD FOR CONTROLLING MOVEMENT OF TRAVELLING CARRIERS

FIELD OF THE INVENTION

The present invention relates to a method for controlling movement of self-propelled travelling carriers to have the travelling carriers move on their own at a fixed low operating speed within a work area while keeping a state that the travelling carries are continuous in a moving direction.

BACKGROUND OF THE INVENTION

In an automobile assembly line, a work area is used where self-propelled travelling carriers loaded with vehicle bodies are moved at a fixed low operating speed with respective work floors thereof being continuous in a moving direction and at the same time required operations are performed on the loaded vehicle bodies. On the occasion when the self-propelled travelling carriers are moved on their own in such a work area, a movement permission needs to be given from the ground to all of the travelling carriers within the work area and the moving at the operating speed needs to be continued during the period when the movement permission is given. If a situation that retreating of the travelling carriers from the work area cannot be continued occurs or if a travelling carrier to be entered into the work area is delayed and the entire region of the work area cannot be provided with the predetermined number of travelling carriers, the movement permission to each travelling carrier needs to be canceled from the ground to stop the travelling carriers on the spot. In performing such control, wired or wireless data communication means capable of communicating between all of the travelling carriers within the work area and the ground are employed in general although no patent documents can be disclosed.

SUMMARY OF THE INVENTION

When wired communication means are employed as the communication means capable of communicating between all of the travelling carriers within the work area and the ground, a communication rail needs to be laid so as to continue throughout the work area and a signal transfer/receiver terminal (a current collector) slidingly contacted with the communication rail needs to be provided to all of the travelling carriers. When the latter wireless communication means are employed, a ground antenna for communication needs to be installed throughout the work area on the ground under the travelling carriers since a loading section for an object to be conveyed and a work floor therearound need to be secured on an upper side of the travelling carrier and consequently an antenna cannot be set up on the upper side of the travelling carrier. Accordingly, neither of them is suitable for maintenance and inspection or layout changes of the work area in the point of requiring something laid on the ground throughout the work area.

Accordingly, the present invention proposes a method for controlling movement of travelling carriers capable of solving the foregoing conventional problems. Described with reference symbols in parentheses used in the description of an embodiment described below in order to facilitate understanding of the relationship with the embodiment, a method for controlling movement of travelling carriers according to the first aspect of the present invention in conveying equipment configured such that a work area (WA) where self-propelled travelling carriers (1) move on their own at a fixed low operating speed while keeping a state of being continuous motion in a moving direction is set within a moving path for the travelling carriers (1), the method is characterized by providing each travelling carrier (1) with a data communication means (13, 14) performing data communication between front and rear adjacent travelling carriers (1) within the work area (WA) and an on-board communication device (15) performing data communication with a ground-based communication device, arranging the ground-based communication device (18a, 18b) at one end of the work area (WA), the ground-based communication device (18a, 18b) sending a movement permission signal to the on-board communication device (15) of a passing travelling carrier (1), transmitting the movement permission signal having been received from the ground-based communication device (18a, 18b) to other all travelling carriers (1) moving within the work area (WA) via the data communication means (13, 14) provided to each travelling carrier (1), and having each of the travelling carriers (1) within the work area (WA) move on its own at the operating speed based on the received movement permission signal.

According to the foregoing method of the present invention, merely sending the movement permission signal from the ground-based communication means arranged at one end of the work area makes all of the travelling carriers within the work area perform movement at an intended operating speed. If a situation that all of the travelling carriers within the work area need to be stopped on the spot occurs, the sending of the movement permission signal from the ground-based communication device has only to be cut off. The transmission of the movement permission signal to all of the travelling carriers within the work area can be performed in such a manner. According to the present invention, the communication means on the ground has only to be arranged at one end of the work area. The need to lay a communication means (such as an antenna wire or a signal transfer rail) continuing on the ground under the travelling carriers throughout the work area as in the conventional manner is eliminated. Therefore, the present invention can be implemented readily and inexpensively, and also can cope with layout changes of the work area easily. Furthermore, the means to transmit the movement permission signal to all of the travelling carriers within the work area performs data communication between front and rear two adjacent travelling carriers, so that a data communication path of which one unit of the data communication means takes charge becomes remarkably short linearly. As a result, a variety of existing and inexpensive data communication means are employed, and the movement permission signal can be transmitted reliably to all of the travelling carriers within the work area, and the intended movement control can be performed without fail.

In carrying out the foregoing method of the present invention, the movement permission signal having been sent from the ground-based communication device (18a, 18b) can be transmitted to each of the travelling carriers (1) within the work area (WA) in the reverse direction via the data communication means (13, 14) of each travelling carrier (1) after reaching a travelling carrier (1) moving the other end of the work area (WA) via the data communication means (13, 14) of each travelling carrier (1). This movement permission signal can be returned to the ground-based communication device (18a, 18b) from a travelling carrier (1) moving one end of the work area (WA) via the on-board communication device (15). Since the movement permission signal circulates through all of the travelling carriers within the work area and is returned to the original ground-based communication device in this manner, having transmitted the movement permission signal to all of the travelling carriers within the work area can be checked at a ground-based control device connected to the ground-based communication device sending the movement permission signal even if no ground-based communication devices to receive the movement permission signal from the travelling carriers are provided at the other end of the work area. As a matter of course, the above can be utilized also as a transmission means for a variety of signals to be transmitted from the travelling carriers within the work area to the ground-based control device.

When the foregoing configuration is employed, the transmission of the movement permission signal to adjacent travelling carriers (1) can be suspended for a travelling carrier (1) becoming unable to move within the work area (WA), and the sending of the movement permission signal from the ground-based communication device (18a, 18b) can be cut off based on no return of the movement permission signal from the travelling carrier (1) moving the one end of the work area (WA) to the ground-based communication device (18a, 18b), and all of the travelling carriers (1) within the work area (WA) can be stopped on the spot. According to this configuration, all of the travelling carriers within the work area can be automatically stopped on the spot when one travelling carrier becomes unable to move within the work area.

It is noted that the data communication means (13, 14) performing data communication between each travelling carrier and its front and rear travelling carriers may be of any configuration. However, the use of an optical communication means employing a photo transmitter-receiver as the data communication means (13, 14) allows not only inexpensive implementation but also easy maintenance, which is practical.

Further, the on-board communication device (15) provided to each travelling carrier (1) and the ground-based communication device (18a, 18b) receiving and sending the movement permission signal from and to the on-board communication device may be of any configuration. When an optical communication means employing a photo transmitter-receiver is used as the communication devices (15 and 18a, 18b) as well, the communication devices (15 and 18a, 18b) are preferably an optical communication means employing a photo transmitter-receiver having a fixed range of a communication area elongated in the moving direction of the travelling carriers (1) since the movement permission signal is received and sent between the moving travelling carrier (1) and a fixed place on the ground. In this case, the ground-based communication device (18a, 18b) can be composed of a plurality of optical communication means juxtaposed at appropriate intervals in the moving direction of the travelling carriers so as for respective communication areas to partially overlap.

BRIEF DESCRIPTION OF THE DRAWINGS

FIG. 2 is a plan view explaining the work area.

FIG. 3A is a plan view showing the first stage of speed control over the travelling carriers at an entrance side of the work area and FIG. 3B is a plan view showing the second stage of the same speed control.

FIG. 4A is a plan view showing the third stage of the same speed control and FIG. 4B is a plan view showing the fourth stage of the same speed control.

FIG. 6A is a plan view showing the second stage of the same speed control and FIG. 6B is a plan view showing a state where an abnormal condition occurs at the second stage.

DETAILED DESCRIPTION OF THE INVENTION

Figure 1A:
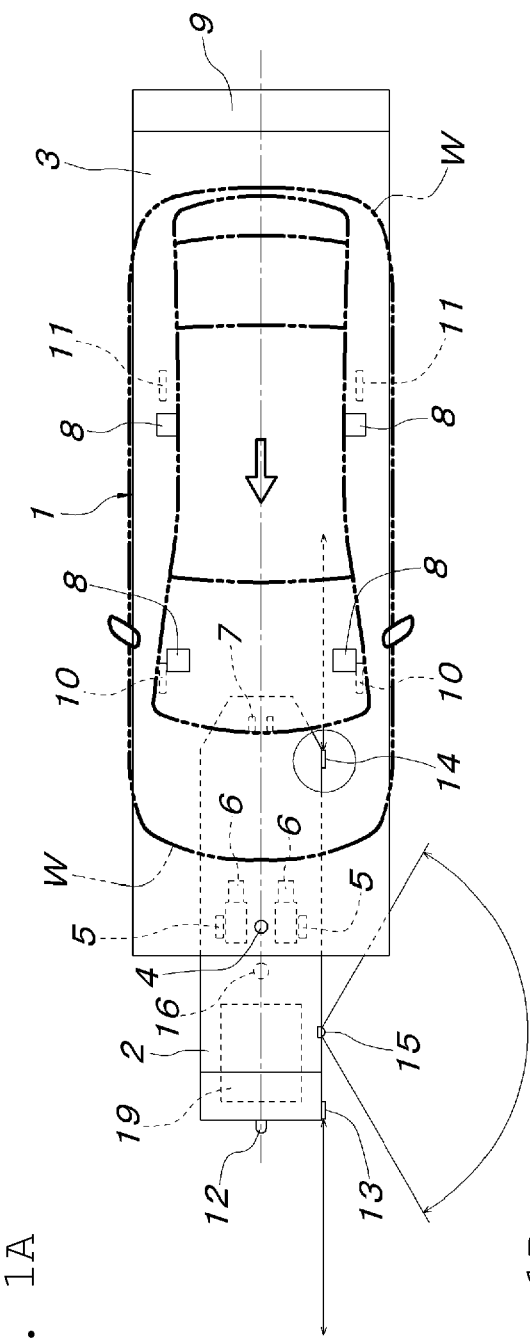
FIG. 1A is a plan view of a travelling carrier and FIG. 1B is a side view showing a moving state of respective travelling carriers in a work area.
Figure 1B:
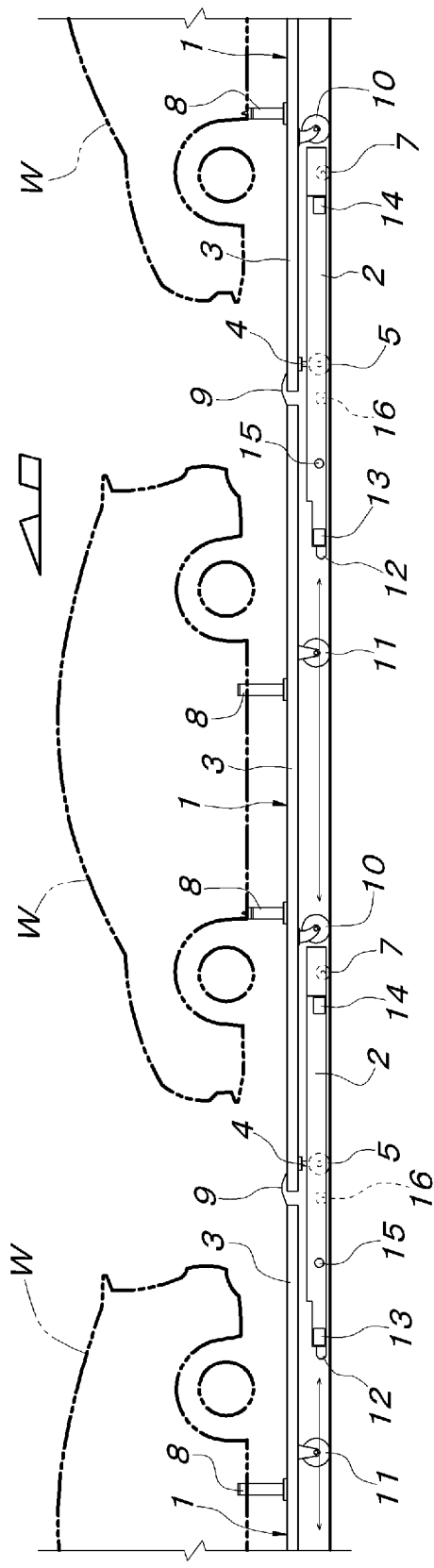

As shown in FIG. 1, a travelling carrier 1 employed in this embodiment consists of a combination of a self-propelled tractor 2 and a conveying carriage 3 towed by the tractor 2. The tractor 2 has such a low-floor structure that the vehicle height thereof is low enough to move under the conveying carriage 3. While a rear half of the tractor 2 is entered under a front end of the conveying carriage 3, the vicinity of a longitudinal center of the tractor 2 and the vicinity of a width center near the front end of the conveying carriage 3 are connected by a vertical connecting shaft 4 so as to be relatively rotatable about the vertical connecting shaft 4. The tractor 2 is provided with a pair of left and right driving wheels 5 positioned at both lateral sides of the vertical connecting shaft 4, a pair of left and right motors 6 respectively driving and rotating the both driving wheels 5 in any of normal and reverse directions, and a rear wheel 7 positioned at the width center near the rear end. The paired left and right driving wheels 5 are fixed in the straight forward direction, and the rear wheel 7 comprises a caster wheel.

The conveying carriage 3 supports an object to be conveyed (a vehicle body or the like) W with a plurality of conveyed object supporting jigs 8 installed upright on a surface (a work floor) of the carriage. The conveying carriage 3 has a rear side from which a cover plate 9 covering a front side of a rear adjacent conveying carriage 3 in the work area extends rearward. The conveying carriage 3 is also provided with a pair of left and right front wheels 10 provided at positions not to interfere with relative rotation of the tractor 2 about the vertical connecting shaft 4 and consisting of caster wheels, and a pair of left and right rear wheels 11 fixed in the straight forward direction.

The tractor 2 has a front end provided with an obstacle sensor 12 detecting an obstacle coming within a fixed forward distance range. Front-rear oriented optical communication devices 13 and 14 using photo transmitter-receivers are attached on front and rear ends of a lateral surface of the tractor 2. A sideways oriented wide-range optical communication device 15 using a photo transmitter-receiver is attached on an intermediate position of the lateral surface of the tractor 2. A fixed position detecting sensor 16 detecting a marker arranged on the floor surface is attached on a bottom surface of the tractor 2. The front-rear oriented optical communication devices 13 and 14 perform, for example, data communication through a 16-bit light with other structurally identical front-rear oriented optical communication devices 13 and 14 of tractors 2 of travelling carriers 1 positioned within fixed forward and rearward distance ranges of the travelling carrier 1 in a straight path. The sideways oriented wide-range optical communication device 15 performs, for example, data communication through an 8-bit light with a structurally identical ground-based wide-range optical communication device positioned within fixed forward and rearward ranges (for example, forward and rearward ranges of 60 degrees respectively) in the moving direction of the travelling carrier 1 when viewed from the wide-range optical communication device 15.

In a circulating moving path for the above-configured travelling carriers 1, a work area WA is set in which a plurality of travelling carriers 1 move straight forward while work floors which are surfaces of conveying carriages 3 of the carriers 1 are continuous, as shown in FIG. 2. In the work area WA, a front half of the tractor 2 projecting forward from the front end of each conveying carriage 3 is entered under a rear end of a conveying carriage 3 of an immediately preceding travelling carrier 1, and the cover plate 9 extending rearward from the rear side of each conveying carriage 3 covers a front side of a conveying carriage 3 of an immediately following travelling carrier 1. Hereinafter, movement control at the time when the travelling carriers 1 enter the work area WA will be described based on FIGS. 3 to 5A. Movement control at the time when the travelling carriers 1 leave the work area WA will be described based on FIGS. 5B to 6. In FIGS. 3 to 6, the travelling carrier 1 composed of the tractor 2 and the conveying carriage 3 is illustrated as simplified into an oblong box-shape in plan. To enhance legibility of the drawings, the fixed position detecting sensor 16 on the bottom surface of the conveying carriage 3 is illustrated on the left surface of the travelling carrier 1, and the optical communication devices 13 and 14 and the wide-range optical communication device 15 are illustrated on the right surface of the travelling carrier 1, laterally opposite to the positions shown in FIG. 1 and FIG. 2.

As shown in FIGS. 3 to 5A, a measurement starting point P1 is set at an upstream fixed position away from the work area WA for a fixed distance, and a docking check position P2 is set around the entrance of the work area WA. At these measurement starting point P1 and the docking check position P2, a marker to be detected by the fixed position detecting sensor 16 provided to the passing travelling carrier 1 is provided on the floor surface or the like. A ground-based wide-range optical communication device 17 performing data communication with the wide-range optical communication device 15 provided to the passing travelling carrier 1 is provided around the entrance of the work area WA. The ground-based wide-range optical communication device 17 can also perform data communication with the wide-range optical communication device 15 passing within fixed forward and rearward ranges (for example, within forward and rearward ranges of 60 degrees respectively) in the moving direction of the travelling carrier 1 when the moving path for the travelling carrier 1 is viewed from the ground-based wide-range optical communication device 17, similar to the wide-range optical communication device 15.

Figure 5A:
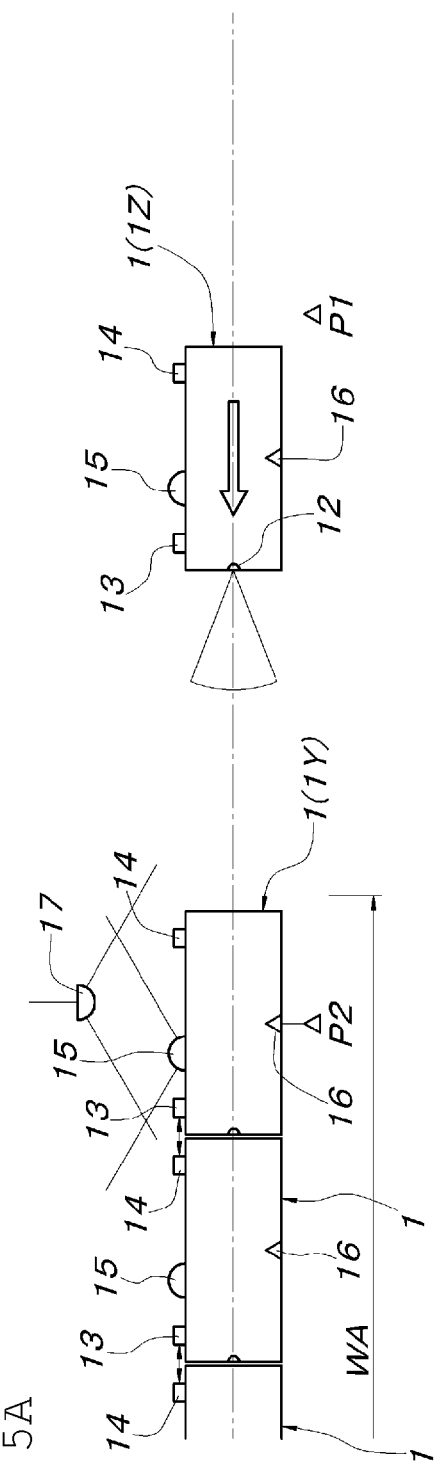
FIG. 5A is a plan view showing the final stage of the same speed control and FIG. 5B is a plan view showing the first stage of speed control over the travelling carriers at an exit side of the work area.
Figure 5B:
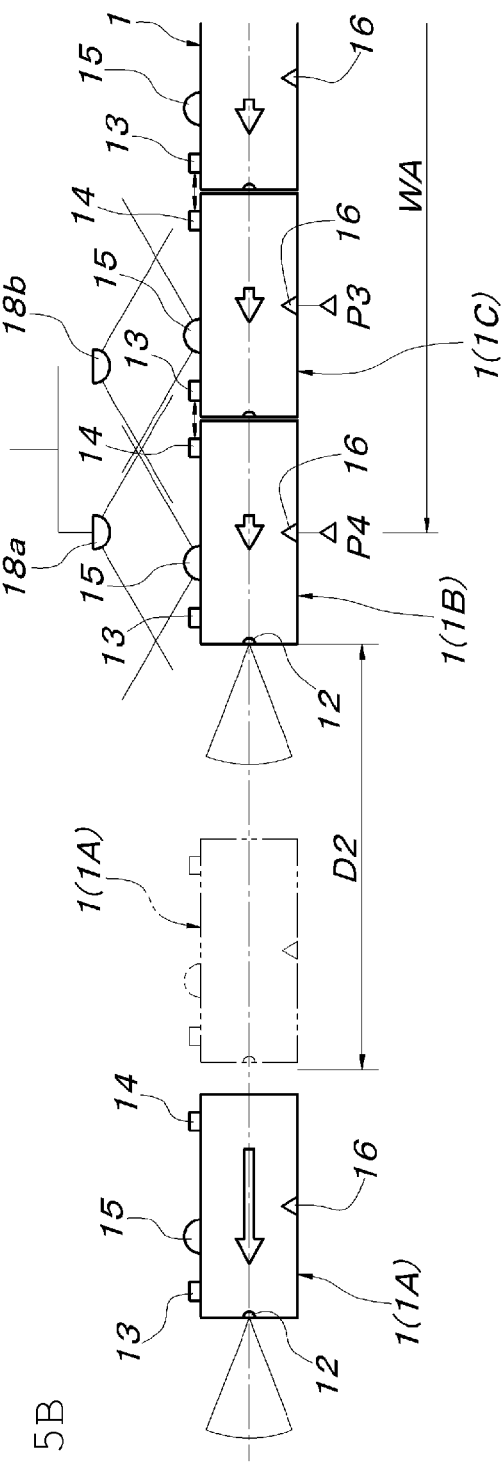

As shown in FIGS. 5B to 6, ground-based wide-range optical communication devices 18a and 18b performing data communication with the wide-range optical communication device 15 provided to the passing travelling carrier 1 are provided around the exit of the work area WA. These ground-based wide-range optical communication devices 18a and 18b can also perform data communication with the wide-range optical communication device 15 passing within fixed forward and rearward ranges (for example, forward and rearward ranges of 60 degrees respectively) in the moving direction of the travelling carrier 1 when the moving path for the travelling carrier 1 is viewed from each of the ground-based wide-range optical communication devices 18a and 18b, similar to the wide-range optical communication device 15. In the drawings, two identical ground-based wide-range optical communication devices 18a and 18b connected in parallel are used to expand the entire communication area in the moving direction of the travelling carrier 1. However, the number of wide-range optical communication devices used is not restricted. As long as the communication area of one wide-range optical communication device is sufficiently wide, the ground-based wide-range optical communication device can be composed of one wide-range optical communication device. Around the exit of the work area WA, a final process check position P4 and a check position before the final process P3 are set at an interval equal to the entire length of one travelling carrier 1. At the two check positions P3 and P4, a marker to be detected by the fixed position detecting sensor 16 provided to the passing travelling carrier 1 is provided on the floor surface or the like. The whole communication area of the two ground-based wide-range optical communication devices 18a and 18b is wide enough to perform data communication with at least the wide-range optical communication devices 15 of front and rear two travelling carriers 1 located at the two check positions P3 and P4 respectively.

A moving speed set for each of the travelling carriers 1 moving on their own within the work area WA in the continuous state as described above is such a fixed low operating speed VL that a worker can carry out operations on an object to be conveyed W having been loaded while safely walking on each work floor of the travelling carrier 1 (conveying carriage 3). In a situation where the travelling carriers 1 are arranged continuously within the entire work area WA, if a movement permission signal at the operating speed is sent, by an action of the ground-based control device, from the ground-based wide-range optical communication devices 18a and 18b provided around the exit of the work area WA, the movement permission signal is transmitted to at least front and rear two travelling carriers 1 located around the exit of the work area WA via the wide-range optical communication devices 15 of the travelling carriers 1. The movement permission signal having been transmitted to the travelling carriers 1 located around the exit of the work area WA is transmitted sequentially to the upstream to all of the travelling carriers 1 within the work area WA via the both front and rear optical communication devices 13 and 14 provided to each travelling carrier 1. The movement permission signal having reached the tail end travelling carrier 1 located around the entrance of the work area WA is in turn transmitted downstream via the both front and rear optical communication devices 13 and 14 provided to each travelling carrier 1. The movement permission signal is then returned to the ground-based control device from the wide-range optical communication device 15 of the travelling carrier 1 located around the exit of the work area WA via the ground-based wide-range optical communication devices 18a and 18b. A relay transmission of the movement permission signal in a unit of making a round trip among all of the travelling carriers 1 within the work area WA is configured to be repeated.

As shown in FIG. 1, each travelling carrier 1 is installed with a control device 19 in the tractor 2 thereof. This control device 19 controls the foregoing relay transmission of the movement permission signal. The control device 19 of the travelling carrier 1 relaying the movement permission signal also controls the paired left and right motors 6 based on the relaying movement permission signal so as to drive the travelling carrier 1 straight forward at the foregoing operating speed VL. Consequently, all of the travelling carriers 1 within the work area WA move straight forward while keeping the foregoing operating speed VL.

When the sending of the movement permission signal from the ground-based wide-range optical communication devices 18a and 18b is cut off by the ground-based control device, the movement permission signal is stopped to be transmitted to all of the travelling carriers 1 within the work area WA. At that moment, the control device 19 of each travelling carrier 1 stops the motors 6 based on no reception of the movement permission signal. Therefore, all of the travelling carriers 1 within the work area WA come to a stop on the spot. On the occasion when an abnormal condition subject to an emergency stop occurs to a specific travelling carrier 1 within the work area WA, the control device 19 of the specific travelling carrier 1 automatically stops the relay of the movement permission signal between the front and rear travelling carriers 1. As a result, the relay transmission of the movement permission signal to be returned to the ground-based control device is cut off. Based on this situation, the ground-based control device suspends the sending of the movement permission signal. As a result, the movement permission signal is not transmitted to all of the travelling carriers 1 within the work area WA, and all of the travelling carriers 1 within the work area WA come to a stop on the spot likewise. The tail end travelling carrier 1 located around the entrance of the work area WA does not carry out the stop control due to not receiving the downstream movement permission signal from the rear travelling carrier 1 based on the determination that the carrier 1 itself is the tail end travelling carrier 1. The tail end travelling carrier 1 reversely transmits the movement permission signal having been received from the immediately preceding travelling carrier 1 to the downstream direction.

Next, movement control over the travelling carrier 1 entering the work area WA will be described based on FIGS. 3 to 5A, FIG. 7, and FIG. 8. Given that the tail end travelling carrier 1 moving around the entrance of the work area WA at the operating speed VL is referred to as a front travelling carrier 1Y and a rear travelling carrier 1Z immediately after the front travelling carrier 1Y is moving toward the work area WA at a high speed VH as shown in FIG. 3A, the rear travelling carrier 1Z continues to move at a high speed VH on condition that the obstacle sensor 12 thereof detects no obstacles in a detection area ahead. If the obstacle sensor 12 detects any obstacle in the detection area ahead, the control device 19 automatically carries out deceleration and stop control in accordance with a preprogrammed deceleration and stop control program at the time of obstacle detection.

Figure 7:
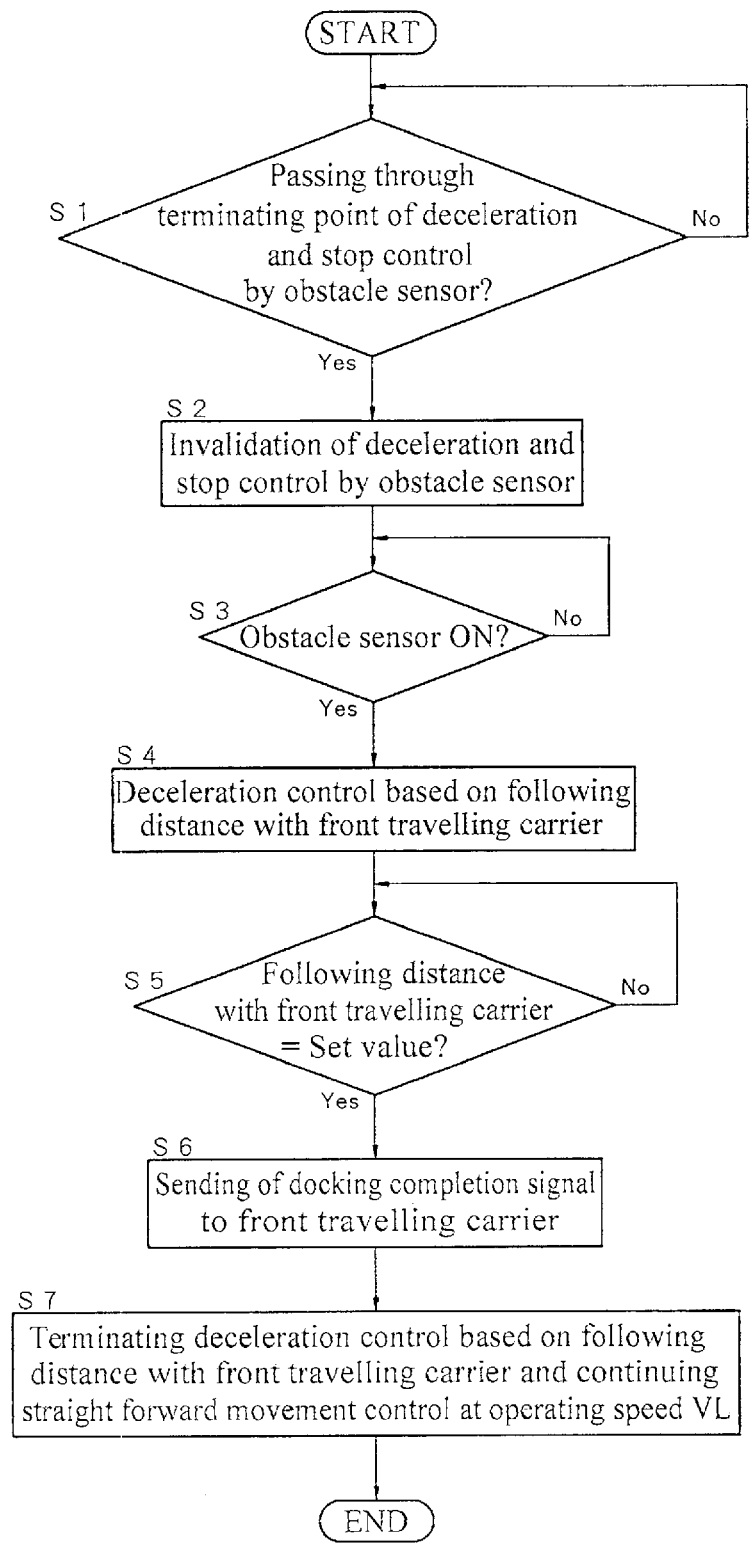
FIG. 7 is a flow chart explaining the control when a travelling carrier moving at a high speed is entered into the work area.

At the point when the rear travelling carrier 1Z passes through a fixed position at a fixed upstream distance from the work area WA (FIG. 7—S1), for example, the point when the rear travelling carrier 1Z passes through the measurement starting point P1 or another fixed position having been set separately from the measurement starting point P1, the deceleration and stop control program at the time of obstacle detection by the obstacle sensor 12 is invalidated (FIG. 7—S2). When the rear travelling carrier 1Z approaches an obstacle detection maximum following distance D1 where the obstacle sensor 12 detects the front travelling carrier 1Y as shown in FIG. 3B, the deceleration control for docking is started. That is, when the obstacle sensor 12 of the rear travelling carrier 1Z detects the front travelling carrier 1Y as an obstacle (FIG. 7—S3), the deceleration and stop control program at the time of obstacle detection executed in the normal movement is not executed, and the deceleration control based on the following distance with the front travelling carrier 1Y is started according to a detection signal ON of the obstacle sensor 12 (FIG. 7—S4).

As shown in FIG. 4A, the front and rear travelling carriers 1Y and 1Z have current location information corresponding to moving distances L1Y and L1Z from respective points of passing through the measurement starting point P1 (points when the fixed position detecting sensors 16 detect the ground-based marker provided at the measurement starting point P1). Specifically, for example, outgoing pulses of a pulse encoder synchronized with rotation of the driving wheel 5 are counted and added from the point of passing through the measurement starting point P1 by an operation function which the control device 19 has. The count value incremented proportional to the moving distance of the travelling carrier 1 can be given as the current location information. The control device 19 of the front travelling carrier 1Y transmits its operating current location information to the rear travelling carrier 1Z via the optical communication devices 13 and 14. The control device 19 of the rear travelling carrier 1Z performs a comparison operation between its operating current location information for the rear travelling carrier 1Z and the received current location information of the front travelling carrier 1Y, and obtains a following distance d with the front travelling carrier 1Y. The motors 6 are controlled in response to decremental changes of the following distance d to decelerate the rear travelling carrier 1Z. The rear travelling carrier 1Z is controlled to decelerate so as to be decelerated to the operating speed VL (FIG. 7—S5) when the following distance d having been calculated reaches a set value which is preset as a docking distance (FIG. 7—S5).

Once the rear travelling carrier 1Z approaches the intended docking distance with respect to the front travelling carrier 1Y by the foregoing deceleration control and is brought into a docking completion state of moving at the same operating speed VL as the front travelling carrier 1Y as shown in FIG. 4B, a docking completion signal is sent to the front travelling carrier 1Y via the optical communication devices 13 and 14 (FIG. 7—S6). The deceleration control based on the following distance is terminated, and the movement at the operating speed VL is continued as it is (FIG. 7—S7).

Figure 8:
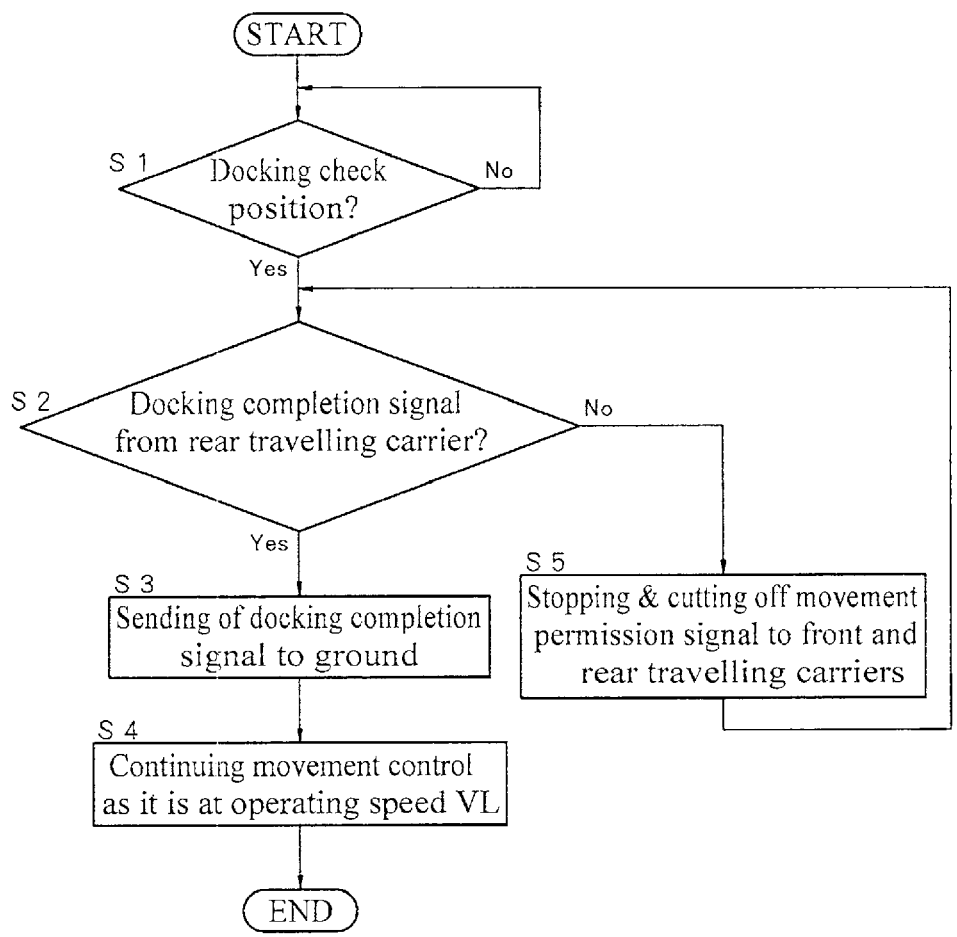
FIG. 8 is a flow chart explaining the control over the tail end travelling carrier in the work area.

The front travelling carrier 1Y does not reach the docking check position P2 yet at the time of the docking completion as shown in FIG. 4B. If the front travelling carrier 1Y already receives the docking completion signal from the rear travelling carrier 1Z (FIG. 8—S2) when reaching the docking check position P2 (FIG. 8—S1), the docking completion signal is sent from the wide-range optical communication device 15 to the ground-based control device through the ground-based wide-range optical communication device 17 (FIG. 8—S3) and the movement at the operating speed VL is continued as it is (FIG. 8—S4). After that, the relay transmission of the movement permission signal as described above is carried out with the rear travelling carrier 1Z as the tail end travelling carrier 1. All of the travelling carriers 1 within the work area WA including the rear travelling carrier 1Z come to move at the operating speed VL for maintaining the continuous state (the docked state).

If the front travelling carrier 1Y reaches the docking check position P2 before the rear travelling carrier 1Z completes the docking with the front travelling carrier 1Y, the stop control is executed on the spot and the relaying action of the movement permission signal is canceled (FIG. 8—S5). As a result, the relay transmission of the movement permission signal to all of the travelling carriers 1 within the work area WA is suspended, and the sending of the movement permission signal from the ground-based wide-range optical communication devices 18a and 18b at the exit of the work area WA is stopped. Therefore, all of the travelling carriers 1 within the work area WA come to a stop and wait. This situation is informed of the ground-based control device from the wide-range optical communication device 15 of the stopping and waiting front travelling carrier 1Y via the ground-based wide-range optical communication device 17.

The rear travelling carrier 1Z approaches the obstacle detection maximum following distance D1 with respect to the stopping and waiting front travelling carrier 1Y, is subjected to the deceleration control based on the following distance described above, and completes being docked with the stopping and waiting front travelling carrier 1Y. Then, the completion of docking is informed of the ground-based control device from the stopping and waiting front travelling carrier 1Y via the wide-range optical communication device 15 and the ground-based wide-range optical communication device 17. The ground-based control device sends the movement permission signal to the forefront travelling carrier 1 stopping and waiting around the exit side of the work area WA from the ground-based wide-range optical communication devices 18a and 18b around the exit side of the work area WA. Thus, the movement permission signal is transmitted to the rear travelling carrier 1Z and all of the travelling carriers 1 stopping and waiting within the work area WA, and the movement at the operating speed VL is resumed. On the occasion when a time delay from the time when the rear travelling carrier 1Z completes being docked with the stopping and waiting front travelling carrier 1Y to the time when all of the travelling carriers 1 within the work area WA including the front travelling carrier 1Y start moving at the operating speed VL is long, the rear travelling carrier 1Z may be controlled so as to stop temporarily during the period until the movement permission signal is sent from the front travelling carrier 1Y to the rear travelling carrier 1Z.

Figure 9:
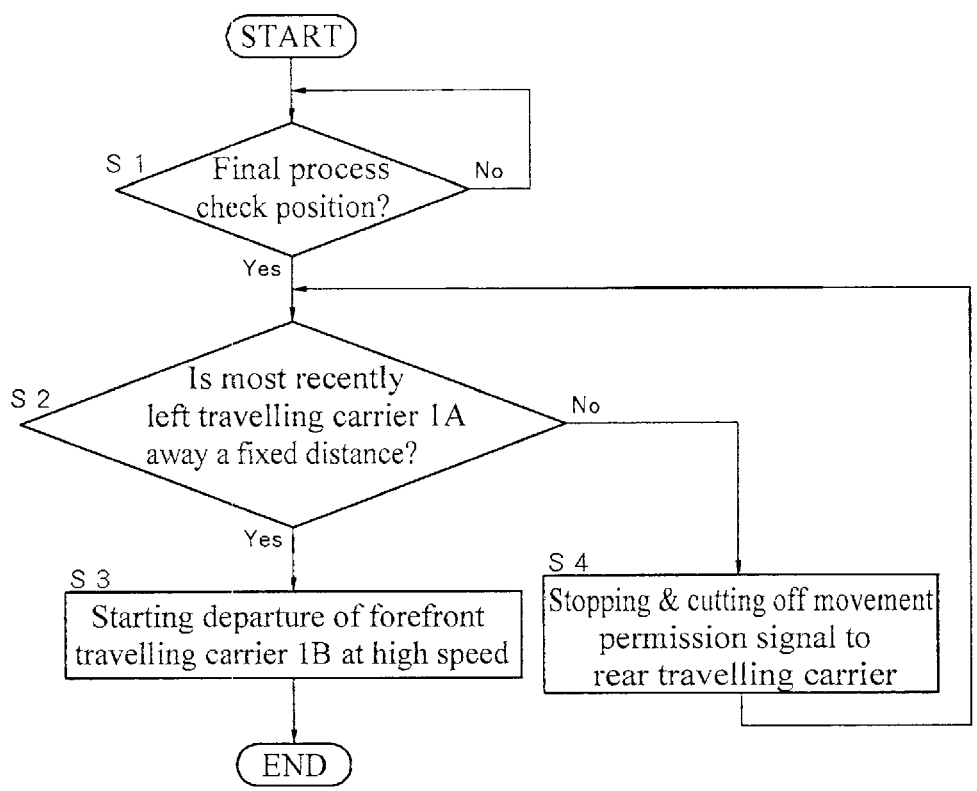
FIG. 9 is a flow chart explaining the control when the forefront travelling carrier is let out from the work area.

Next, movement control over the travelling carrier 1 at the time of leaving the work area WA will be described based on FIGS. 5B to 6, FIG. 9, and FIG. 10. As shown in FIG. 5B, a travelling carrier 1 most recently having left the work area WA and moving at a high speed VH is referred to as a most recently left travelling carrier 1A, and a travelling carrier 1 located at the final process check position P4 of the work area WA is referred to as a forefront travelling carrier 1B, and a travelling carrier 1 located at the check position before the final process P3 of the work area WA is referred to as a second travelling carrier 1C. When the forefront travelling carrier 1B reaches the final process check position P4 (FIG. 9—S1), this information is transmitted to the ground-based control device from the wide-range optical communication device 15 of the forefront travelling carrier 1B via the ground-based wide-range optical communication devices 18a and 18b. The ground-based control device makes a determination whether the most recently left travelling carrier 1A at that moment is within the range of a fixed safety distance D2, with respect to the forefront travelling carrier 1 B. If the most recently left travelling carrier 1A is already away forward from the range of the fixed safety distance D2 (FIG. 9—S2), the sending of the movement permission signal from the ground-based wide-range optical communication devices 18a and 18b is continued. Thus, the control device 19 of the forefront travelling carrier 1B controls to accelerate the motors 6 based on reaching the final process check position P4 and receiving the movement permission signal, and lets the forefront travelling carrier 1B out of the work area WA at a high speed VH (FIG. 9—S3).

When determining that the most recently left travelling carrier 1A is within the fixed safety distance D2 as shown by virtual lines in FIG. 5B, the ground-based control device stops the sending of the movement permission signal from the ground-based wide-range optical communication devices 18a and 18b. Therefore, the relay transmission of the movement permission signal as described above is suspended, and all of the travelling carriers 1 within the work area WA including the forefront travelling carrier 1B come to a stop and wait on the spot (FIG. 9—S4). The foregoing control is executed after the most recently left travelling carrier 1A advances forward from the fixed safety distance D2, and then the forefront travelling carrier 1B leaves the work area WA at a high speed VH, and at the same time, the second travelling carrier 1C and all of its following travelling carriers 1 within the work area WA start moving at the operating speed VL again. The forefront travelling carrier 1B leaving the work area WA at a high speed VH is applied also with the normal deceleration and stop control based on the obstacle detection by the obstacle sensor 12 since the deceleration and stop control program based on the obstacle detection by the obstacle sensor 12 having been invalidated before the forefront travelling carrier 1B enters the work area WA is returned to be valid before the forefront travelling carrier 1B reaches the final process check position P4 as will be described later.

Figure 10:
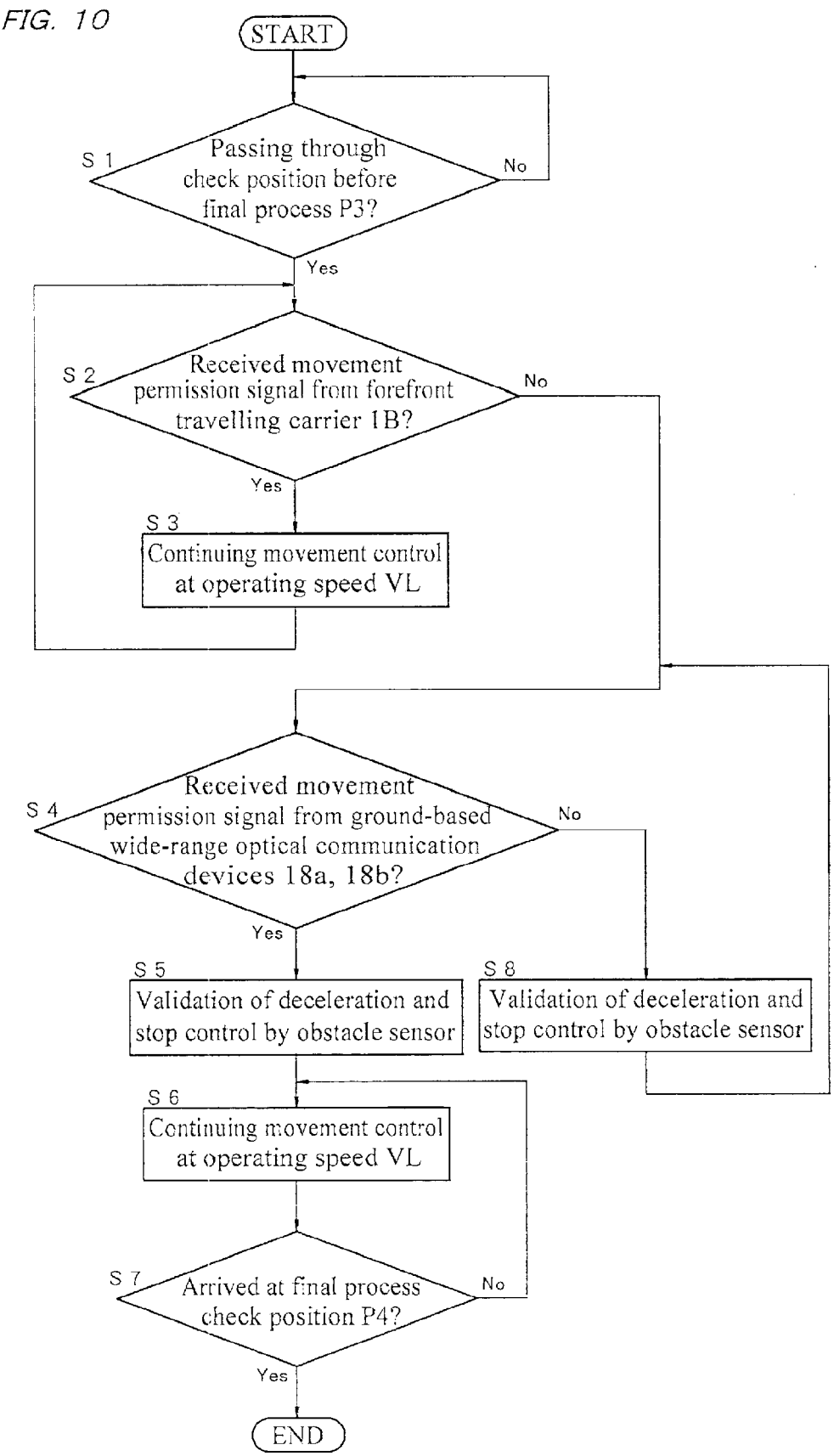
FIG. 10 is a flow chart explaining the control over the second travelling carrier following the forefront travelling carrier in the work area.

When passing through the check position before the final process P3 (FIG. 10—S1), on the other hand, the second travelling carrier 1C already receives the movement permission signal from the forefront travelling carrier 1B passing through the final process check position P4 via the optical communication devices 13 and 14 (FIG. 10—S2). Therefore, the second travelling carrier 1C continues to move at the operating speed VL (FIG. 10—S3). On the occasion when the forefront travelling carrier 1B leaves the final process check position P4 and moves to leave the work area WA at a high speed VH through the foregoing action and when the following distance between the forefront travelling carrier 1B and the second travelling carrier 1C becomes larger than what the data communication by the optical communication devices 13 and 14 is available, the second travelling carrier 1C becomes unable to take over the movement permission signal from the forefront travelling carrier 1B via the front and rear optical communication devices 13 and 14. However, on condition that the second travelling carrier 1C between the check position before the final process P3 and the final process check position P4 has received the movement permission signal from the ground-based wide-range optical communication devices 18a and 18b via the wide-range optical communication device 15 (FIG. 10—S4), the movement at the operating speed VL can be continued (FIG. 10—S6) until reaching the final process check position P4 (FIG. 10—S7). Due to that the second travelling carrier 1C has received the movement permission signal from the ground-based wide-range optical communication devices 18a and 18b, the relay transmission of the movement permission signal to all of the travelling carriers 1 within the work area WA continuing rearward from the second travelling carrier 1C is also continued, and all of the travelling carriers 1 within the work area WA also follow the second travelling carrier 1C and move at the operating speed VL.

The deceleration and stop control program based on the obstacle detection by the obstacle sensor 12 of each travelling carrier 1 having been invalidated before entering into the work area WA is validated at the time when the second travelling carrier 1C having passed through the check position before the final process P3 shifts from the movement based on the movement permission signal from the forefront travelling carrier 1B to the stage of continuing the movement only based on the movement permission signal from the ground-based wide-range optical communication devices 18a and 18b (FIG. 10—S5). Accordingly, the deceleration and stop control based on the obstacle detection by the obstacle sensor 12 is used together for the second travelling carrier 1C having passed through the check position before the final process P3 after the forefront travelling carrier 1B leaving the work area WA at a high speed VH is away forward and the second travelling carrier 1C comes to receive no movement permission signal. If the forefront travelling carrier 1B having started departing the final process check position P4 with speed is stopped for some reason at a position which can be detected by the obstacle sensor 12 of the second travelling carrier 1C before reaching the final process check position P4, as shown in FIG. 6, the second travelling carrier 1C is stopped on the spot by the action of the normal deceleration and stop control program based on the obstacle detection by the obstacle sensor 12, and at the same time, the relay transmission of the movement permission signal to the following travelling carrier 1 is also stopped. Thus, all of the travelling carriers 1 within the work area WA with the second travelling carrier 1C at the forefront result in stopping and waiting on the spot until the movement at a high speed VH of the abnormally stopped forefront travelling carrier 1B is resumed.

On the occasion when the sending of the movement permission signal from the ground-based wide-range optical communication devices 18a and 18b is cut off by the action of the ground-based control device, the second travelling carrier 1C having passed through the check position before the final process P3 stops on the spot, and the relay transmission of the movement permission signal to the following travelling carrier 1 is also cut off. Therefore, all of the travelling carriers 1 within the work area WA with the second travelling carrier 1C at the forefront come to a stop and wait on the spot until the sending of the movement permission signal from the ground-based wide-range optical communication devices 18a and 18b is resumed (FIG. 10—S8).

The above movement control makes it possible that the travelling carrier 1 moving at a high speed is automatically controlled to decelerate and then entered into the work area WA, that all of the travelling carriers 1 are driven at the fixed operating speed VL in the continuous state of adjoining each other within the work area WA, and that each travelling carrier 1 having reached the exit of the work area WA is automatically controlled to accelerate and then let out at a high speed VH.

INDUSTRIAL APPLICABILITY

The method for controlling movement of travelling carriers of the present invention can be utilized as a method for controlling movement on the occasion when self-propelled travelling carriers loaded with vehicle bodies are driven at a fixed operating speed while maintaining the continuous state at a fixed work area in an automobile assembly line.

What is claimed is:

1. A method for controlling movement of travelling carriers in conveying equipment where self-propelled travelling carriers move on their own at a fixed low operating speed while maintaining continuous motion in a moving direction in a work area within a moving path for the travelling carriers, the method comprising:
providing each of the travelling carriers with a data communication means for performing data communication between front and rear adjacent travelling carriers within the work area and providing each travelling carrier with an on-board communication device operable to perform data communication with a ground-based communication device;
the ground-based communication device being disposed at a first end of the work area, and the ground-based communication device sending a movement permission signal to the on-board communication device of a passing travelling carrier;
transmitting, in first direction, the movement permission signal received by the passing travelling carrier from the ground-based communication device to all other travelling carriers moving within the work area via the data communication means provided to each of the travelling carriers; and
each of the travelling carriers within the work area moving on its own at the operating speed based on the received movement permission signal.

2. The method for controlling movement of travelling carriers according to claim 1, further comprising:
transmitting the movement permission signal to each of the travelling carriers within the work area in a reverse direction, opposite the first direction, via the data communication means of each of the travelling carriers, after the movement permission signal sent from the ground-based communication device reaches a travelling carrier at a second end of the work area opposite the first end; and
returning the movement permission signal from a travelling carrier at the first end of the work area to the ground-based communication device via the on-board communication device.

3. The method for controlling movement of travelling carriers according to claim 2, further comprising:
a travelling carrier unable to move within the work area suspending transmission of the movement permission signal to adjacent travelling carriers;
cutting off sending of the movement permission signal from the ground-based communication device based on no return of the movement permission signal from the travelling carrier at the first end of the work area to the ground-based communication device; and
stopping all of the travelling carriers within the work area.

4. The method for controlling movement of travelling carriers according to claim 1, wherein the data communication means comprises an optical communication means using a photo transmitter-receiver.

5. The method for controlling movement of travelling carriers according to claim 1, wherein the ground-based communication device and the on-board communication device comprise optical communication devices using a photo transmitter-receiver having a fixed range of a communication area elongated in the moving direction of the travelling carriers.

6. The method for controlling movement of travelling carriers according to claim 5, wherein the ground-based communication device comprises a plurality of the optical communication devices, and the respective optical communication devices being disposed at intervals in the moving direction of the travelling carriers so as for respective communication areas to partially overlap.

* * * * *